April 5, 1927.
C. M. ANDERSON
1,623,902
COOLING SYSTEM FOR MOTOR VEHICLES
Filed Dec. 24, 1924     4 Sheets-Sheet 1
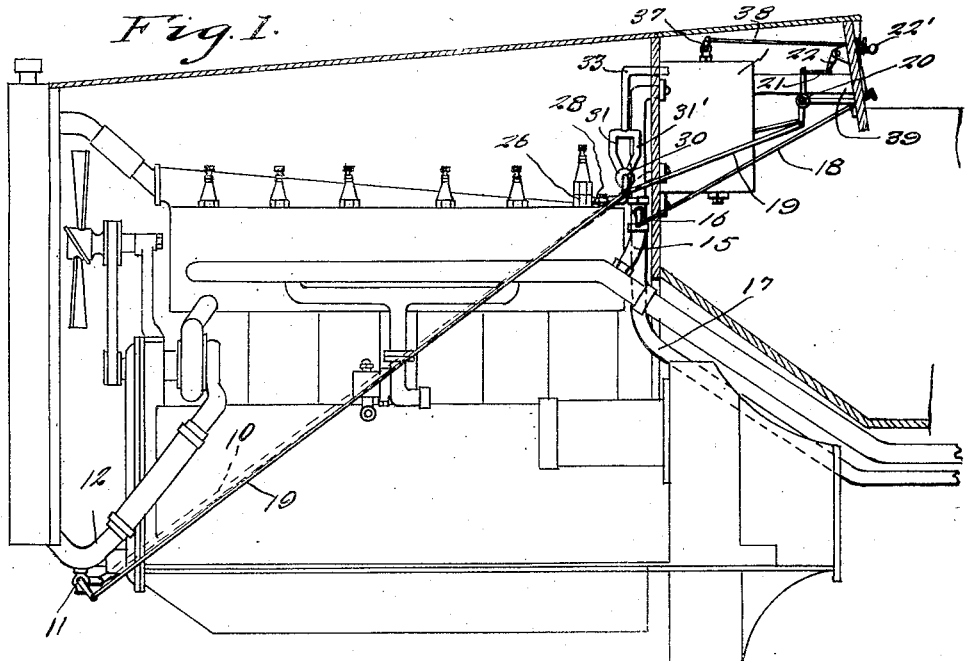
Witness
P. Q. Thomas
Inventor
Carl M. Anderson.
By Victor J. Evans
Attorney

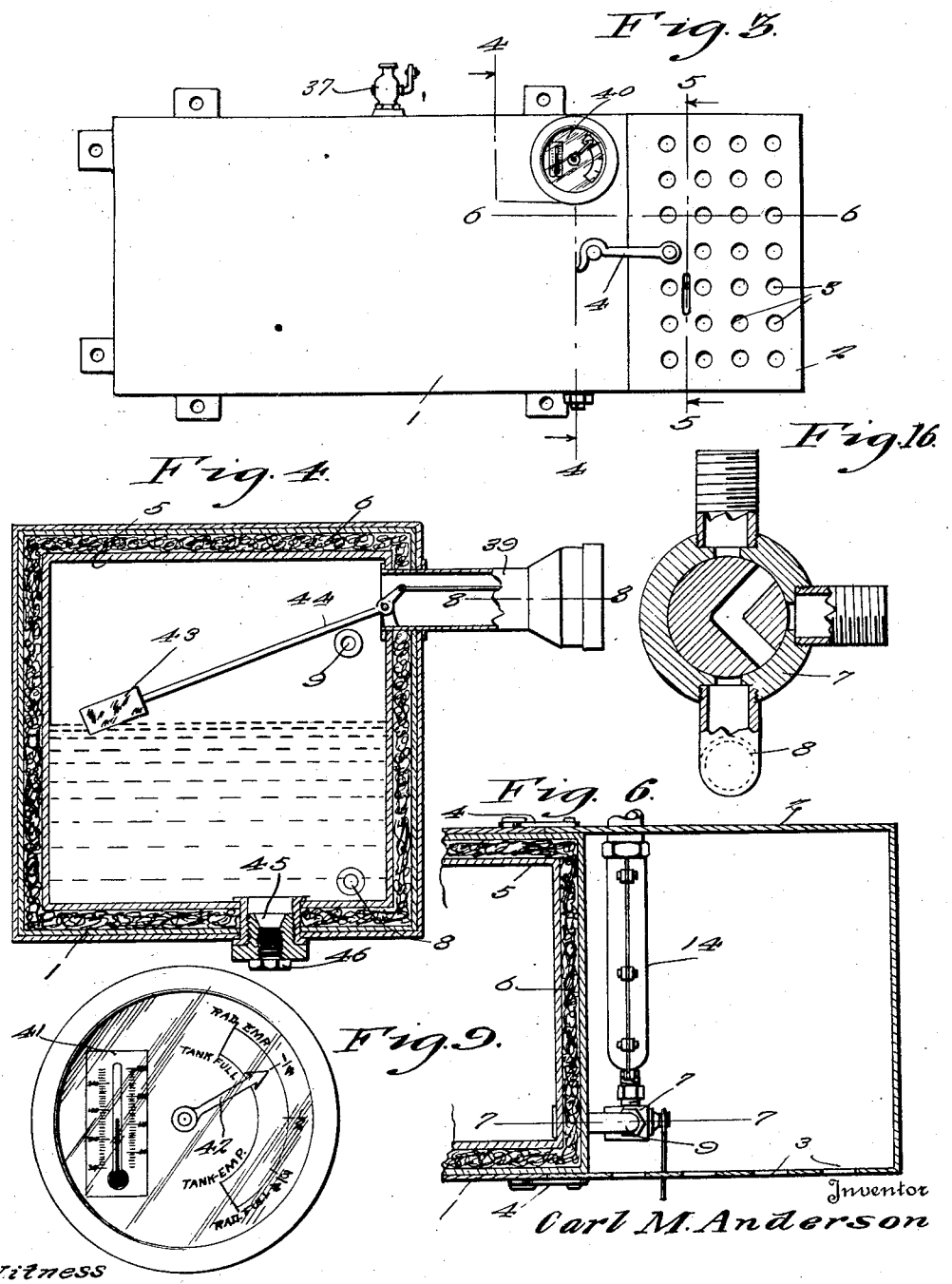

April 5, 1927.                C. M. ANDERSON                1,623,902
                    COOLING SYSTEM FOR MOTOR VEHICLES
                    Filed Dec. 24, 1924      4 Sheets-Sheet 3
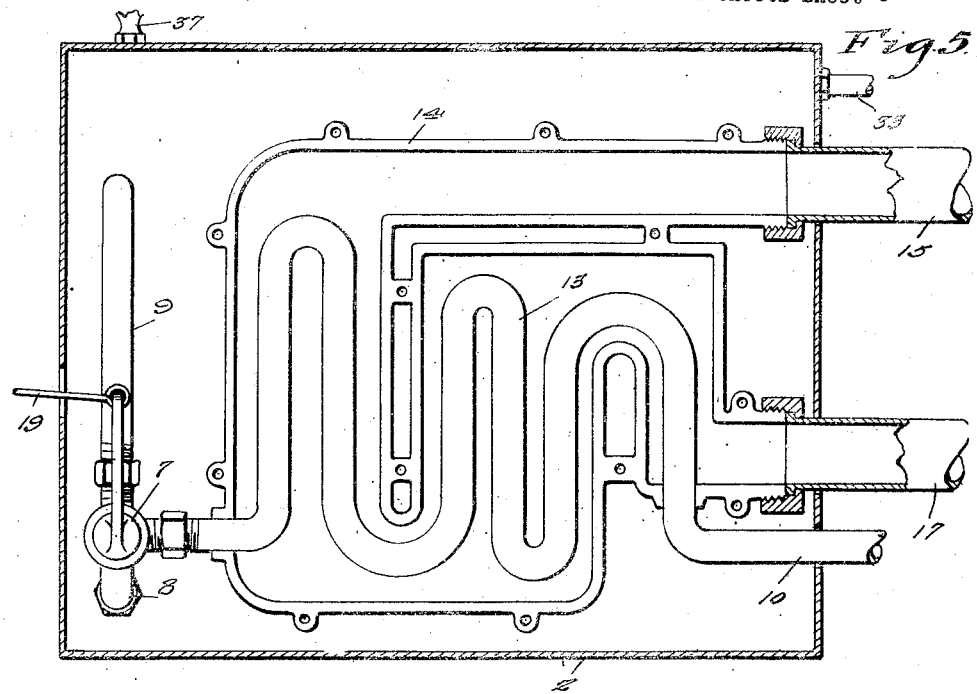
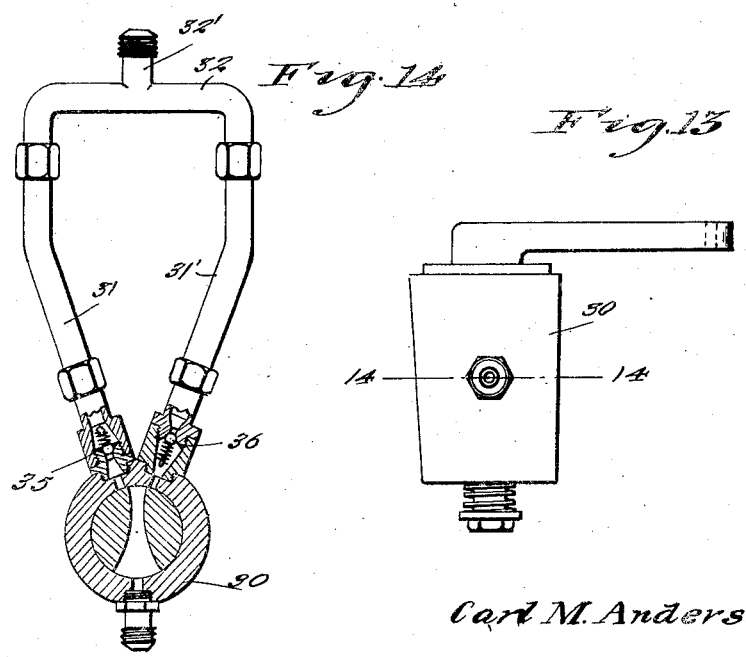
Witness
R. A. Thomas
Inventor
Carl M. Anderson
By Victor J. Evans
                Attorney

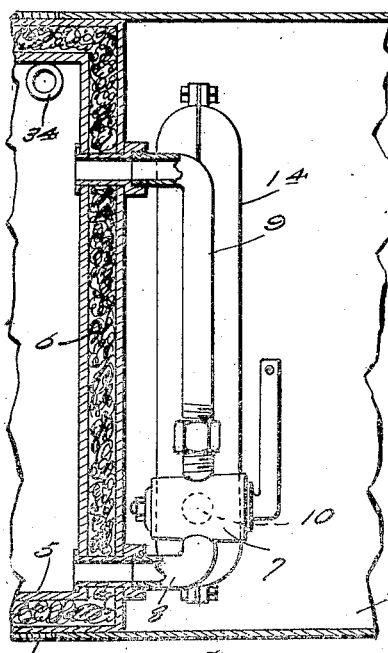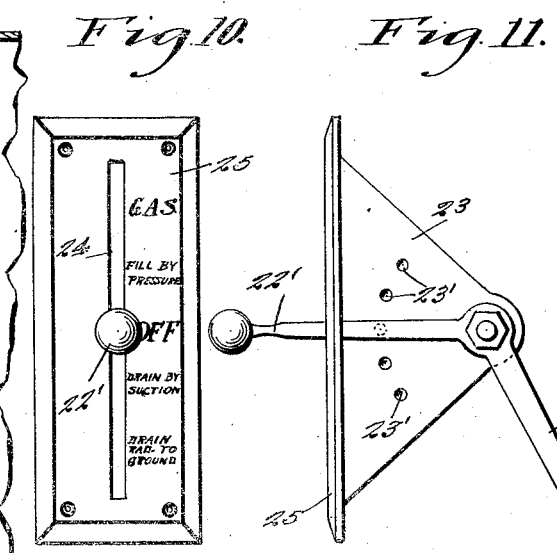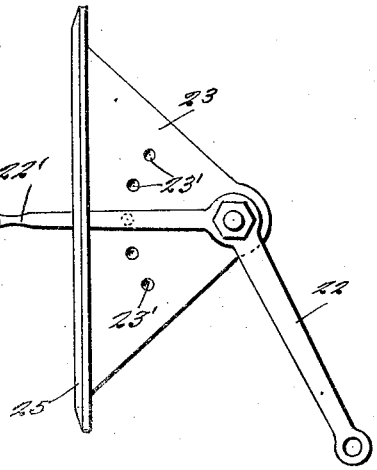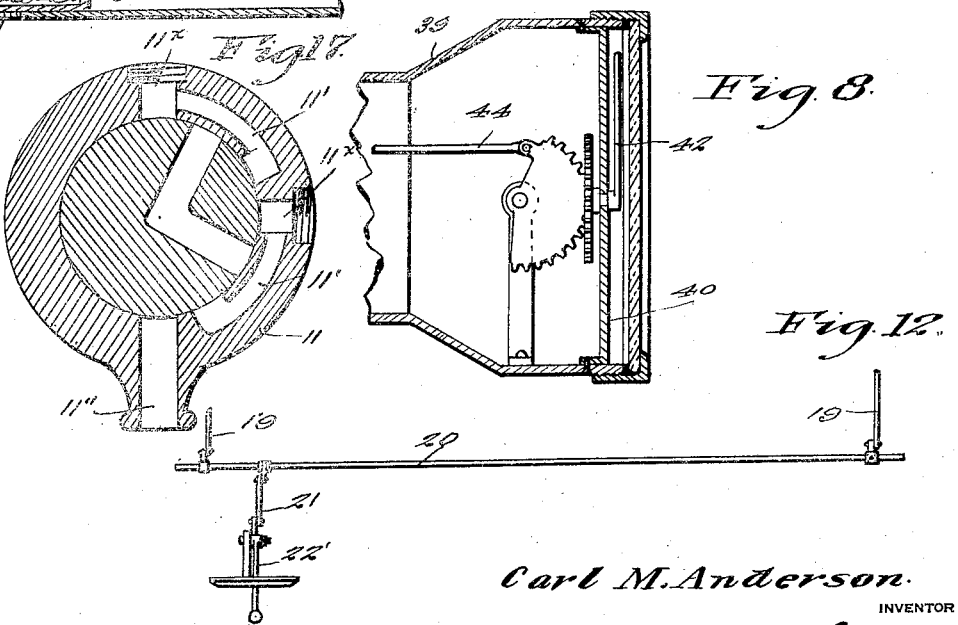

Patented Apr. 5, 1927.

1,623,902

UNITED STATES PATENT OFFICE.

CARL MAGNUS ANDERSON, OF BALTIMORE, MARYLAND, ASSIGNOR OF ONE-HALF TO MICHAEL CHONKICH, OF BALTIMORE, MARYLAND.

COOLING SYSTEM FOR MOTOR VEHICLES.

Application filed December 24, 1924. Serial No. 757,891.

This invention relates to improvements in motor vehicles, the general object of the invention being to provide an insulated tank for holding the water of the cooling system of a motor of a vehicle to keep the water from freezing, with means for causing the water to pass from the system into the tank and vice versa.

Another object of the invention is to provide means for heating the water as it passes from the tank to the cooling system, when desired or necessary.

Another object of the invention is to provide means whereby pressure can be applied to the water in the tank to force the water therefrom, or to create a suction in the tank to draw the water from the system into the tank, such means including a device placed in a spark plug hole of a motor and adapted to support a spark plug.

A further object of the invention is to provide means for operating the various parts of the invention from a point adjacent the driver's seat.

A further object of the invention is to provide means for indicating the level of water in the tank and the temperature of the water.

Another object of the invention is to so form the parts that the device can be used for heating the vehicle and as an additional gasoline tank, this latter use being only possible when the tank is not being used to hold the water from the cooling system.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is a longitudinal sectional view through the front of a motor vehicle showing the invention in use.

Figure 2 is a transverse sectional view through the body of a vehicle showing the arrangement of parts on the dash and instrument board.

Figure 3 is a front view of the casing for holding the tank and the heater.

Figure 4 is a section on line 4—4 of Figure 3.

Figure 5 is a section on line 5—5 of Figure 3.

Figure 6 is a section on line 6—6 of Figure 3.

Figure 7 is a section on line 7—7 of Figure 6.

Figure 8 is a section on line 8—8 of Figure 4.

Figure 9 is a face view of the indicator and thermometer.

Figure 10 is a face view of the dial and operating lever for the attachment.

Figure 11 is a side view of Figure 10.

Figure 12 is a plan view of the parts shown in Figures 10 and 11, and showing the rock shaft.

Figure 13 is a view of one of the cocks.

Figure 14 is a section on line 14—14 of Figure 13.

Figure 15 is a view of the pump device.

Figure 16 is a sectional view through the cock for controlling the inlet and outlet of the tank.

Figure 17 is a sectional view through the cock in the up-take of the cooling system.

In these views, 1 indicates a casing which is adapted to be fastened to the dash of a motor vehicle and 2 indicates a detachable extension of said casing which is provided with perforations 3 and which is held to the casing by the latches 4. An insulated tank 5 is placed in the casing, said tank having double walls spaced apart to receive insulating material 6 so that water placed in the tank will not freeze and will retain its heat for a long time. A three-way valve or cock 7 is connected with the lower part of the tank by the connection 8 and with the upper part thereof by the connection 9 and a pipe 10 connects the third nipple of the valve with a three-way cock or valve 11 placed at the lowest point of the up-take 12 of the cooling system of the motor of the vehicle. The part of the pipe 10 adjacent the cock 7 is formed with the coils 13 and these coils, the cock 7 and its connections with the tank are all located in the extension 2 of the casing 1. A heater casing 14 is placed in the extension and surrounds the coils 13 and this heater casing is connected with the exhaust manifold of the motor by the pipes 15 which contain the valve 16 and the outlet of the heater casing is connected with the discharge pipe 17 so that by opening the valve 16 some of the exhaust gases will pass through the heater casing 14 and heat the water passing through the coils 13. This valve can be controlled from the instrument board through the rod 18, and the valves 7 and 11 are connected by the rods 19 with a rock shaft 20 which is connected by a link 21 with a bell crank lever 22 which is pivoted to a bracket 23 on the instrument board and which has its handle part 22' passing through a slot 24 formed in a dial 25 carried by the bracket and which contains indicia for indicating the various positions of the bell crank for moving the valves to their desired positions in order to control the flow of water to and from the tank.

In order to force the water from the cooling system into the tank and vice versa I provide a tubular plug 26 designed to be placed in a spark plug hole of a motor and which has its upper part threaded to receive a spark plug so that the device forms a firing chamber when the motor is operating. This plug has a port 27 therein which extends through a nipple so that the plug can be connected by a pipe 28 with a cock 30, the handle of which is connected with one of the rods 19 so it will be operated from the bell crank 22. A pair of pipes 31 and 31' connect the cock 30 with a yoke-shaped pipe 32 which has its nipple 32' connected by a pipe 33 with the port 34 at the top of the tank. A check valve 35 is placed in the pipe 31 and a check valve 36 in the pipe 31', these valves acting in opposite directions so that when the cock connects the plug 26 with the pipe 31 some of the pressure in the cylinder will pass into the tank above the water level thereof through pipe 31 and its connections and when the cock is turned to connect the pipe 31' with the plug 26 the suction created by the moving piston will create a vacuum in the tank through the pipe 31' and its connection. It will be seen that the valve 35 in pipe 31 will prevent the suction of the moving piston from affecting pipe 31 and the tank while the valve 36 will prevent pressure entering the pipe 31' and the tank. Thus the motor can be made to create pressure or a vacuum in the tank by the positioning of the valve 30.

A cock 37 is arranged on the top of the tank and casing for permitting air to pass into the tank when desired. This cock is controlled from the instrument board through means of the rod 38. A tubular member 39 is connected with the top of the tank and passes through the instrument board where it is provided with a dial 40 and a thermometer 41, a finger 42 cooperating with the dial and being operated from a float 43 in the tank through means of the connections 44 so that the level of water in the tank can be ascertained and the temperature of the water will be indicated by the thermometer. The gauge will indicate when the tank is full and the cooling system empty and the system full and the tank empty, as shown in Figure 9.

In order to enable the tank to be used as an auxiliary tank for gasoline in the summer time or when the device is not being used in connection with the cooling system, I place a threaded nipple 45 in the bottom of the tank and casing and place therein a plug 46 for receiving a tube which may be connected with the carbureter or a tank of the fuel system so that the auxiliary supply of gasoline can be fed to the said system. A valve can be placed in the tube and operated from the rock shaft 20 by connecting one of the rods 19 of said shaft with said valve. It will be seen that the dial 25 has the word "gas" thereon for indicating where the handle 22' is to be located to open this valve in the gas line. The plug 46 is substituted for a solid plug when the device is being used with the cooling system. The plug 45 provides an opening for cleaning the tank.

In order to permit the valve 11 to be moved by the handle 22' to permit the water to be drawn from the cooling system to the tank by moving the handle 22' from the "off" position on the dial to the "drain" position and to permit the water to be forced by pressure from the tank to the system by moving the handle 22 from its "off" position to its "fill" position I provide said valve with the passages 11' which communicate with the ports $11^x$ so that the valve will connect the pipe 10 with the up-take 12 when in either one of its two positions. By swinging the handle 22' to its lowermost position the valve 11 will be opened to the drain 11'' so that the cooling system and the tank will be drained.

From the foregoing it will be seen that by moving the handle 22' downwardly one point, the handle being held in its adjusted positions by the projections 23' on the bracket 23, and starting the motor a suction will be created in the tank and the valves 11 and 7 will be moved to a position where this suction will draw the water from the system into the tank. After all the water has been drawn from the system, the gauge indicating this, the handle is moved to its "off" position so as to close the cocks and the valve 30. Then the motor is stopped. The entire amount of water in the cooling system will now be in the tank and as said tank is insulated the water cannot freeze and as the system is empty there is no danger of this freezing. When the vehicle is to be used again the cock 37 is opened to permit air to enter the tank to replace the water leaving the same and the bell crank is moved to a point to open the valves 7 and 11 to permit the water to flow from the tank back into the system. If the water has become cold the valve 16 can be opened and the motor started to heat the water as it passes through the coils 13 by the exhaust gases flowing through the heater casing 14. When the motor is operating the valve 37 should be closed and the valve 30 moved so that the engine will create pressure in the tank to force the water therefrom. The valve 37 can be used to permit the water to flow back into the cooling system from the tank under the action of gravity when the engine is not running and it is not necessary to heat the water. In this case the coils 13 act as a siphon to empty the tank, the large coil being of less height than the level of the water in the tank when all the water is in the tank.

The heater arrangement can be also utilized for heating the car or vehicle.

By using this arrangement on automobiles and the like it is not necessary to use alcohol or other anti-freezing mixtures in the cooling water though such mixtures can be used if desired. The tank, being insulated, will prevent the water from freezing so that after the vehicle has been used and is to be left for the night the handle is set to cause the motor to create a suction in the tank and the valve set to permit this suction to draw the water from the system into the tank. Then the handle is put in its neutral position and the motor stopped. This will leave the system empty. Then when the vehicle is to be used again the parts are set so that the water will pass from the tank to the cooling system under the action of gravity, or the parts may be set so that, when the motor is started, pressure will occur in the tank and the valves opened to permit the water to flow back into the system from the tank, the water being heated by the exhaust gases, when desired, by opening the valve 16. All the controlling means are arranged on the instrument board so that the driver can operate the apparatus without leaving his seat. As before stated, the tank can be used as an auxiliary tank for fuel when it is not being used for the water cooling system.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. In combination with an internal combustion engine, an insulated tank connected with the cooling system thereof, means actuated by the engine for creating a suction in the tank to draw the water from the system to the tank, means for permitting the water to return to the system from the tank by gravity, means actuated by the engine for creating pressure in the tank to force the water therefrom into the system, a level indicating gauge connected with the tank and a thermometer associated with the gauge.

2. In combination with an internal combustion engine, a tubular plug adapted to be placed in one of the spark plug holes thereof, the top part of the bore being threaded to receive a spark plug, a three-way cock, a pipe connecting the cock with the tubular plug, a pair of pipes connected with the other ports of the cock, oppositely arranged check valves in said pipes, a tank, means for connecting the pair of pipes with the tank so that either a pressure or a vacuum may be formed in the tank by the operation of the engine, according to the position of the cock.

3. In combination with an internal combustion engine of a motor vehicle, an insulated tank connected with the cooling system of the motor, means actuated by the engine for creating a vacuum in the tank to draw the water from the cooling system into the tank, means for permitting the water to flow back into the system from the tank, means for heating the water in its passage to the system from the tank by some of the exhaust gases from the engine and means for controlling the before mentioned means from a point adjacent the driver's seat of the vehicle.

4. In combination with a motor vehicle, a casing connected with the dash thereof, an insulated tank in the casing, an extension on the casing having perforations therein, a heater in the extension, means for causing some of the exhaust gases to pass through the heater, means for connecting the cooling system of the motor of the vehicle to the tank, such means including a pipe, portions of which are coiled and placed in the heater, means actuated from the motor for creating a vacuum or a pressure in the tank and manual means arranged on the instrument board for controlling the passage of exhaust gases to the heater, the flow of water to and from the tank and the operation of the vacuum and pressure producing means.

5. In combination with a motor vehicle, a casing connected with the dash thereof, an insulated tank in the casing, an extension on the casing having perforations therein, a heater in the extension, means for causing some of the exhaust gases to pass through the heater, means for connecting the cooling system of the motor of a vehicle to the tank, such means including a pipe having coils arranged in the heater, means actuated from the motor for creating a vacuum or a pressure in the tank, manual means for controlling all of the before mentioned means and means on the instrument board and associated with the tank for indicating the level of water in the tank and the temperature of the water.

In testimony whereof I affix my signature.

CARL MAGNUS ANDERSON.